United States Patent [19]

Shyu

[11] Patent Number: 4,824,649

[45] Date of Patent: Apr. 25, 1989

[54] HIGH VISCOSITY POTASSIUM METAPHOSPHATE

[75] Inventor: Lieh-Jiun Shyu, Brewster, N.Y.

[73] Assignee: Stauffer Chemical Company, Shelton, Conn.

[21] Appl. No.: 91,139

[22] Filed: Aug. 31, 1987

[51] Int. Cl.$^4$ ............................................. C01B 25/30
[52] U.S. Cl. ................................................... 423/314
[58] Field of Search ........................................ 423/314

[56] References Cited

U.S. PATENT DOCUMENTS

| | | | |
|---|---|---|---|
| 2,557,109 | 6/1951 | Iler et al. | 423/314 |
| 3,342,738 | 9/1967 | Shen | 423/314 |
| 3,361,523 | 1/1968 | Shen | 423/314 |
| 3,378,340 | 4/1968 | Martin et al. | 423/314 |
| 3,414,375 | 12/1968 | Leroy et al. | 423/314 |
| 3,650,684 | 3/1972 | Watson | 423/314 |

FOREIGN PATENT DOCUMENTS

| | | | |
|---|---|---|---|
| 522352 | 3/1956 | Canada | 423/314 |
| 587269 | 11/1959 | Canada | 423/314 |
| 185413 | 10/1983 | Japan | 423/314 |
| 309930 | 9/1971 | U.S.S.R. | 423/314 |
| 832011 | 4/1960 | United Kingdom | 423/314 |
| 1051946 | 12/1966 | United Kingdom | 423/314 |

OTHER PUBLICATIONS

"Potassium Metaphosphate; Molecular Weight Viscosity Behavior and Rate of Hydrolysis of Non-Cross-Linked Polymer", R. Pfanstiel et al., *Journal of American Chemical Society* 74, pp. 6059-6064 (1952).

Primary Examiner—John Doll
Assistant Examiner—Wayne A. Langel
Attorney, Agent, or Firm—Paul J. Juettner

[57] ABSTRACT

An improved process for preparing potassium metaphosphate is provided which comprises reacting potassium ions, preferably from the carbonate or bicarbonate, with phosphare ions in an amount sufficient to provide a K/P molar ratio ranging from about 0.85 to about 0.95 substantially in the absence of metal ion other than potassium under heat for a period of time and at a temperature sufficient to convert the potassium and phosphate ions to potassium metaphosphate but insufficient to overconvert. A product of higher viscosity can be obtained by dissolving the potassium metaphosphate in sodium bicarbonate rather than using other sources of sodium ion, particularly when the potassium metaphosphate is prepared with potassium bicarbonate or potassium carbonate.

7 Claims, No Drawings

HIGH VISCOSITY POTASSIUM METAPHOSPHATE

The present invention relates to a process for preparing potassium metaphosphate of improved solution viscosity.

BACKGROUND OF THE PRESENT INVENTION

Potassium metaphosphate, a.k.a. potassium Kurrol's salt, is known to be practically insoluble in water. However, potassium metaphosphate can form a solution in the presence of other metal cations such as sodium cations (Comprehensive Inorganic Chemistry, Vol. 2, chapter 20, page 524–1973). Potassium metaphosphate shows the unusual capability of providing a high viscosity material when the molar ratio of K/P ranges from about 0.8 to 0.99 with a maximum at about 0.9 (Phosphorus and its Compounds, Vol. I by J. P. Van Wazer, 1961, pages 676–677).

Potassium metaphosphate can be prepared by reacting potassium salts, such as potassium chloride and potassium hydroxide, with phosphoric acid.

In the past, various problems have arisen in preparing potassium metaphosphate by heating phosphoric acid with potassium hydroxide at a K/P molar ratio of 0.9–0.95 at temperatures above 500° C. In order to prepare potassium metaphosphate of high voscisity, high temperatures are needed. These temperatures stress the effectiveness of stainless steel at avoiding corrosion to its limits. High temperatures also cause the potassium metaphosphate to melt. Corrosion of the reaction vessel occurs at points where the melt contacts the stainless steel. Potassium metaphosphate so prepared often had a slight green discoloration due to the corrosion. While it is easiler to manufacture potassium metaphosphate at lower temperatures which do not present the corrosion problems, viscosity suffers because of the decreased temperature.

Potassium metaphosphate has also been prepared by contacting phosphoric acid with potassium hydroxide in a molar ratio of 1:1.10 (K/P molar ratio of 0.909) and agitated to produce a monopotassium phosphate liquor. The pH (of a 1% solution) was adjusted to pH 3.5–3.6 and Baume' of 28°–30°. The monopotassium phosphate was heated in a rotary kiln at 580° C. to 620° C.

BRIEF SUMMARY OF THE PRESENT INVENTION

In accordance with the present invention, there is provided an improved process for preparing potassium metaphosphate which comprises reacting potassium ions with phosphate ions in an amount sufficient to provide a K/P molar ratio ranging from about 0.85 to about 0.95, substantially in the absence of metal ion other than potassium under heat for a period of time and at a temperature sufficient to convert the potassium and phosphate ions to potassium metaphosphate but insufficient to overconvert. By controlling the purity of the potassium and phosphate sources, a product can be obtained which provides a solution of higher viscosity and better stability. It has also been found that the use of potassium carbonate/bicarbonate as the source of potassium cation is preferred as it leaves no residual anion.

It has also been found that a product of higher viscosity can be obtained by dissolving the potassium metaphosphate in sodium bicarbonate rather than using other sources of sodium ion, particularly when the potassium metaphosphate is prepared with potassium bicarbonate or potassium carbonate.

DETAILED DESCRIPTION OF THE INVENTION

The potassium metaphosphate of the invention is prepared by reacting a potassium source and phosphoric acid or a potassium phosphate at elevated temperatures for a period of time sufficient to provide the viscosity desired.

The materials used in the invention are substantially pure and particularly free of other metal cations, especially sodium, aluminum, and iron cations. By substantially pure is meant less than 0.1% metal other than potassium.

The source of potassium can include potassium chloride, potassium hydroxide, potassium carbonate, potassium bicarbonate, potassium phosphate, potassium acetate, potassium nitrate and potassium sulfate, though other potassium salts with non-interfering anions can also be used. The most preferred potassium salt is potassium bicarbonate.

In using a potassium salt, the phosphorus is preferably provided by phosphoric acid. Since the reaction of the potassium salt and phosphoric acid forms a potassium orthophosphate, monopotassium phosphate can also be used in the invention if the material is substantially free of metals as defined hereinbefore.

The potassium ion is used in relation to phosphorus ion in an amount sufficient to provide a K/P molar ratio of from about 0.85 to about 0.95. As the molar ratio approaches 1, the viscosity of a solution of the potassium metaphosphate decreases markedly. The molar ratio can be attained by adjusting the amount of the potassium ion used to the phosphoric acid used or by adding phosphoric acid to a phosphate salt.

The mixture of potassium salt and phosphoric acid or, in essence, a potassium orthophosphate is heated for a period of time sufficient to convert the reactants to potassium metaphosphate but insufficient to overconvert the materials. The term "overconvert" is intended to mean melting the salt and forming potassium polyphosphate glass. While the conversion temperature can range from about 550° C. to about 700° C., time and temperature conditions are selected to obtain conversion without forming a melt of potassium metaphosphate. Viscosity decreases have been obtained from melted over non-melted potassium metaphosphate.

The period of time for heating sufficient to obtain the desired product can vary over a wide range, generally at least 0.5 hours being a minimum. Significant variation in the viscosity of the final product does not occur above about 2 hour heating time, particular at temperatures ranging from about 580° C. to about 650° C. At temperatures around 600° C., the upper time limit used for heating is not critical. Heating is preferably conducted for a time ranging from about 1 to about 5 hours and, more preferably, from about 1.5 hours to about 3 hours at temperatures in the range of from about 600° C. to about 650° C.

The conversion reaction is conducted in equipment which can operate at elevated temperature and withstand the corrosive effects of the reactants and products. Vessels made of stainless steel, porcelain or glass, and platinum can be used.

After conversion, the potassium metaphosphate is cooled to a sufficiently low temperature for further processing and milling. The product is preferably slowly cooled rather than quenched on a cooled metal plate or in a cooled fluid such as water. The potassium metaphosphate can then be milled to reduce the material to a size for effective dissolution. The degree of fineness contributes to the ease of dissolution.

Crystalline potassium metaphosphate is practically insoluble in distilled water though it can be dissolved in water in the presence of cations other than potassium. Potassium metaphosphate can commonly be dissolved using sodium salts such as sodium chloride, sodium bicarbonate, and sodium carbonate in a mass ratio of two equivalents of sodium salts to one equivalent of potassium metaphosphate. While a wide variety of sodium salts can be used to dissolve the potassium metaphosphate of the invention, it has been found that a potassium metaphosphate prepared in accordance with the invention from potassium carbonate, and preferably potassium bicarbonate, and phosphoric acid provides a higher viscosity solution when using sodium bicarbonate rather than sodium chloride. In contrast, a commercially available potassium metaphosphate, whose process of manufacture is not known, provides a higher viscosity when dissolved with sodium chloride than with sodium bicarbonate (as compared to a control of the product of the invention dissolved with sodium chloride). In dissolving the product of the invention, sodium bicarbonate provides a solution of greater viscosity than that obtained using sodium chloride which provides a more viscous solution than that obtained using sodium hydroxide which provides a more viscous solution than potassium metaphosphate and tap water.

In addition, the commercially available potassium metaphosphate when dissolved with sodium chloride is acidic. The product of the invention when dissolved with sodium bicarbonate is neutral. A neutral pH is more adaptable for cosmetic formulations. The product of the present invention appears to provide a more stable viscosity when dissolved with sodium bicarbonate than with sodium chloride.

The amount of potassium metaphosphate used in the solution depends on the final viscosity desired. Greater viscosities are obtained as more potassium metaphosphate is used. As an example, and for a cosmetic base, 0.08% potassium metaphosphate and 0.16% sodium bicarbonate can be used.

The compositions of the present invention can be used in combination with tetrasodium pyrophosphate to improve the texture and homogenity of ground meat in sausages and reduce fat loss during cooking. Potassium metaphosphate can also be used as a thickening agent in cosmetics and food.

The present invention will be more fully illustrated in the Examples which follow.

EXAMPLE 1

57.65 grams of 85% $H_3PO_4$ (mineral content less than 0.01%) were slowly added to and mixed with 45 grams $KHCO_3$ (K/P ratio=0.90) in a porcelain crucible with a stirring rod until homogeneous. The purity of the $KHCO_3$ was 99.98% with less than 0.02% mineral content. $CO_2$ was evolved during mixing. The crucible was placed in a muffle furnace preheated to 650° C. and heated for 2 hours. The crucible was removed from the furnace, cooled to room temperature and the potassium metaphosphate solids milled in a shatter box mill.

The process was repeated using a K/P ratio of about 0.9 at varying heating times and at 2 hours using varying K/P ratios. All heating was conducted at 650° C. Viscosity was measured in centistokes at 25° C. using a Canon-Fenske viscometer tube and a potassium metaphosphate solution dissolved with sodium bicarbonate in amounts of 0.08% potassium metaphosphate to 0.16% sodium bicarbonate, said percentages being by weight of the solution. The following results were obtained:

| Exp. | Heating Time Hours | K/P Ratio | Viscosity Centistokes |
| --- | --- | --- | --- |
| 1 | 2 | 0.8 | 4.58 |
| 2 | 2 | 0.85 | 11.04 |
| 3 | 0.43 | 0.9 | 6.82 |
| 4 | 0.88 | 0.9 | 9.76 |
| 5 | 2 | 0.9 | 12.87 |
| 6 | 4.85 | 0.9 | 12.02 |
| 7 | 18.4 | 0.9 | 12.89 |
| 8 | 67.5 | 0.9 | 11.28 |
| 9 | 2 | 0.95 | 7.42 |
| 10 | 2 | 1.00 | 2.21 |
| 11 | 2 | 1.05 | 1.88 |

Those samples with a K/P ratio of from about 0.85 to about 0.95 showed the greatest viscosity increase. Heating time is not as critical though at less than 0.5 hour the viscosities obtained are less than desirable.

What is claimed is:

1. A process for preparing potassium metaphosphate of high solution viscosity which comprises reacting potassium ion derived from potassium carbonate, potassium bicarbonate or potassium orthophosphate with phosphate ion in an amount sufficient to provide a K/P ratio on a molar basis ranging from about 0.85 to about 0.95 substantially in the absence of metal cation other than potassium under heat for a period of time and at a temperature sufficient to convert the potassium and phosphate ions to potassium metaphosphate but insufficient to overconvert.

2. The process as recited in claim 1 wherein the phosphate ions are derived from phosphoric acid.

3. The process as recited in claim 1 wherein the heating temperature ranges from about 550° C. to about 700° C.

4. The process as recited in claim 1 wherein the metal cations are sodium, aluminum and iron cations.

5. The process as recited in claim 1 wherein the K/P molar ratio is 0.90±0.05.

6. The process as recited in claim 1 wherein the temperature ranges from about 600° C. to about 650° C. and the time of heating ranges from about 1.5 to about 3 hours.

7. The process as recited in claim 1 wherein the potassium ion source and the phosphate ion source contain less than 0.1% metal other than potassium.

* * * * *